March 22, 1966  E. LILIENFELD  3,242,411
CONTROL SYSTEM TO TERMINATE BATTERY CHARGING
Filed July 30, 1962

INVENTOR.
ERICH LILIENFELD
BY
Irving Holtzman
ATTORNEY.

United States Patent Office 3,242,411
Patented Mar. 22, 1966

3,242,411
CONTROL SYSTEM TO TERMINATE BATTERY CHARGING
Erich Lilienfeld, Elmhurst, N.Y., assignor to Yardney International Corp., New York, N.Y., a corporation of New York
Filed July 30, 1962, Ser. No. 213,223
5 Claims. (Cl. 320—43)

This invention relates to a device to be used in storage battery-charging apparatus; for instance, to control at end-of-charge voltage (i.e. when the battery is fully charged), the disconnection of the charger from the line voltage, thus ending charging. It can also generally be used, as a combined over-and-under voltage sensor, capable of performing switching operations (directly or indirectly). Another characteristic is its capability of discriminating between pure A.C. and pulsating D.C. current. However, it has particular application as a battery charger cut-off control, which will be described in detail.

A battery or accumulator is fully charged when its voltage, under charge, reaches a point at which gases start to evolve at the electrodes. Means for automatically disconnecting the charging at end of charge are usually controlled by the battery being charged. This can be done by either interrupting the D.C.-charging current be-between battery and D.C.-voltage source (output of charger), or by disconnecting the charger input from the line voltage. Cut-off controls with high precision are very costly; devices with moderate precision are not dependable (and still costly).

It is an object of this invention to provide a highly accurate, compact, light and economical control system for automatically cutting off the charging current when the end of charge has been reached.

It is also an object of the present invention to provide a switch system suitable for use in the above-mentioned system.

It is a further object of this invention to provide a more durable system of this type by using switches enclosed in an inert gas atmosphere.

These and other objects of the invention will become apparent upon consideration of the accompanying specication, claims and drawings wherein:

Figure 1:
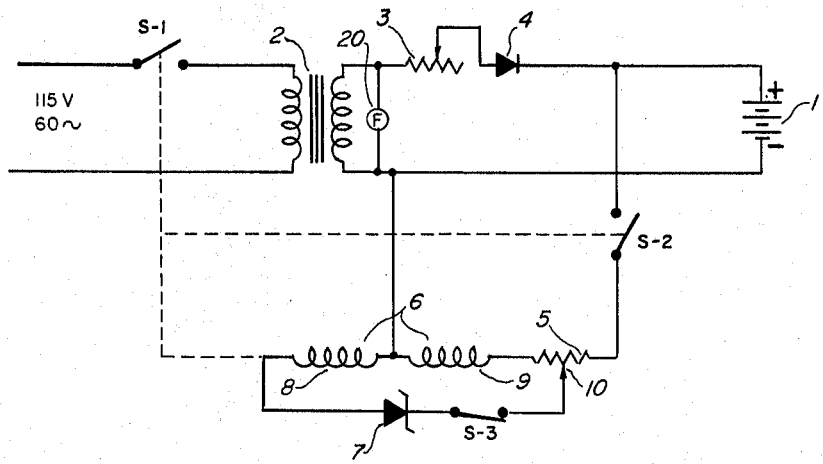
FIG. 1 is a circuit diagram of one embodiment of the invention.

Referring to FIG. 1, there is shown a battery 1 which is connected to a battery charger, consisting of a line transformer 2, a current-limiting resistor 3 and a rectifier 4. A pilot light 20 is shunted across the secondary of the transformer 2. Parallel to the battery, the control unit is connected in series with the switch S–2, consisting of a voltage divider 5 (potentiometer), a differential coil 6, a Zener diode 7, and starting switch S–3. Switch 3 is section 3 of a 3-pole 2-position spring loaded switch, sections 1 and 2 of which are in parallel with switches S–1 and S–2. The switches S–1 and S–2 are glass-sealed reed switches, which work by magnetic attraction between contacts. This attraction is controlled in this embodiment by electromagnetic fields built-up in the differential coil 6 by currents flowing into coils 8 and 9.

When all the switches (S–1, S–2, and S–3) are closed, the charger will eventually bring the battery voltage up to the end of charge point. A portion of this voltage will appear across the movable potentiometer arm 10, the Zener diode 7, and coil 8. The entire battery voltage is across the full potentiometer 5 and coil 9, sending a current through coil 9 which builds up in the coil a magnetizing field used to hold closed the contacts of switches S–1 and S–2.

The voltage fed to the Zener diode 7, can be adjusted precisely by the potentiometer or voltage divider 5 to cause avalanche breakdown at the end of charge voltage of the battery, giving rise to the Zener current. This current, flowing into coil 8, builds up an electromagnetic field opposing the field of coil 9 (coils 8 and 9 are parts of the differential coil 6 which surrounds the switches S–1 and S–2). The two fields cancel each other and both switches open.

Switch S–1 disconnects the primary of the charger transformer from the line, thus ending charging. Switch S–2 disconnects the voltage sensor network from the battery, thus preventing discharge through it of the battery. Discharge through the rectifier 4, is negligible since a current of less than 5 micro-amperes is flowing, which is much less than the internally flowing self-discharge current of a battery. The battery virtually is disconnected from the charger, due to the open switch behavior of a rectifier 4 (silicon rectifier, for instance).

When no battery is connected to the charger terminals, the voltage appearing across the sensor network is pulsating D.C. This rapidly varying 60-cycle field will not hold the magnetic reed switches closed, and the switches vibrate strongly (armature chatter), producing a clearly audible buzzing sound and acoustically signalling the absence of the battery from the charger or a bad contact. Only when a battery is connected to the charger will the charger voltage become filtered by the huge capacity of the battery (a physical characteristic of batteries) and the reed switch contacts will be closed.

Since in this modification of the invention the switches S–1 and S–2 are normally open, by some means (magnetically or electrically), the contacts S–1 and S–2 have to be closed momentarily (for instance by means of parallel connected contacts of a spring-return switch). In order to connect a nearly fully charged battery, if so desired, the rather effective bucking field in coil 8 must be momentarily neutralized to facilitate closing of switches S–1 and S–2 by the holding field in coil 9. This is done by simultaneously opening switch S–3 (while closing switches S–1 and S–2).

When the battery is removed from the charger, the filtering effect disappears, voltage will pulsate and the contacts S–1 and S–2 will open. This is a way of automatically disconnecting the charger from the line. When during the charge operation, the line voltage is temporarily interrupted, the switch contacts remain closed (by the battery voltage); as soon as the line voltage returns, charging will resume.

Figure 2:
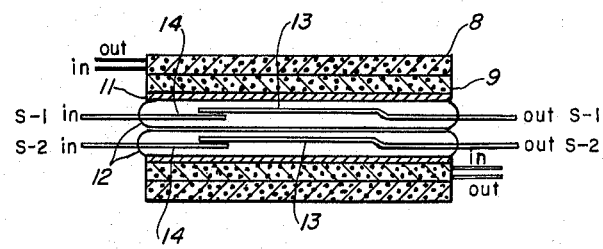
FIG. 2 is a cross-sectional view of a switch system which is embodied in the present invention.

FIG. 2, as noted above, illustrates a switch system that may be utilized in the present invention and particularly in connection with the embodiment of the invention illustrated in FIG. 1. It consists of coils 8 and 9 wound in opposite directions on a hollow mandrel 11. Accordingly, current flowing in coil 8 will generate a magnetic field in one direction which will be opposed by the magnetic field generated by current flowing in coil 9.

Two reed switches S–1 and S–2 are inserted inside of the cylindrical opening in the mandrel. The reed switches are items of commerce and their construction is well known to those skilled in the art. They consist of sealed glass tubes 12 in which are contained a pair of precious metal-plated contacts 13 and 14. Glass tubes 12 contain an inert gas to prevent the deterioration of the metal contacts.

In use during charging, the current is flowing in coil 9 and magnetic field generated thereby, keeps the contacts in switches S–1 and S–2 closed. When the voltage of the battery reaches the cut-off voltage, a current flows through the Zener diode circuit and coil 8 is energized. The magnetic field produced by this current bucks the magnetic field in coil 9 and when the two are equal, there is no magnetic field in the coil and the switches open.

Although the control circuit of the present invention has been described in connection with a battery charging system, it obviously has wider application. It may be used in any system which requires a voltage control between a minimum and maximum valve and particularly in a system which requires that a switching function be performed when the maximum and the minimum voltage are attained. Thus, for example, it may also be used for switching purposes of a "battery cycler" (cycler "on" at preset minimum battery voltage, "off" at preset maximum battery voltage, discharge starting simultaneously and stopping simultaneously at the attainment of the preset minimum battery voltage), acting as a low-cost "meter switch" with superior mechanical stability.

Whereas the invention has been described with reference to specific forms thereof, it will be understood that many changes and modifications may be made without departing from the spirit of this invention.

What is claimed is:

1. In a voltage-responsive control system for a battery charger having a source of electric current connectable with a battery adapted to develop a variable potential thereacross, in combination, switch means interposed between said source and said battery, said switch means having a first operative position wherein said battery is connected with said source and a second operative position wherein said battery is disconnected from said source; electromagnetic means for operating said switch means, said electromagnetic means including a pair of oppositely poled coils adapted to act upon said switch means; normally conductive first circuit means connecting one of said coils across said battery for energizing said one of said coils to maintain said switch means in said first position; normally nonconductive second circuit means connecting the other of said coils across said battery; and a Zener breakdown device in said second circuit means for rendering the latter substantially instantaneously conductive upon the potential across said battery reaching a predetermined magnitude for energizing said other of said coils to trip said switch means into its second position.

2. In a system for charging a battery, in combination, a source of pulsating direct current connectable across said battery; switch means in circuit with said source for selectively energizing and de-energizing same in respective positions of said switch means; electromagnetic means for operating said switch means, said electromagnetic means including a pair of oppositely poled coils acting upon said switch means; normally conductive first circuit means connecting one of said coils across said battery for energizing said one of said coils to maintain said switch means in a position wherein said source is energized; normally nonconductive second circuit means connecting the other of said coils across said battery; and a Zener-diode breakdown device in said second circuit means for rendering the latter conductive substantially instantaneously upon the potential across said battery reaching a predetermined magnitude for energizing said other of said coils to trip said switch means into a position wherein said source is de-energized.

3. In a system for charging a battery, in combination, a source of pulsating direct current connected across said battery; reed-switch means in circuit with said source for selectively energizing and de-energizing same in respective positions of said switch means; electromagnetic means for operating said switch means, said electromagnetic means including a pair of coaxial oppositely poled coils surrounding said switch means and acting thereupon; normally conductive first circuit means connecting one of said coils across said battery for energizing said one of said coils to maintain said switch means in a position wherein said source is energized; normally nonconductive second circuit means connecting the other of said coils across said battery; and a Zener-diode breakdown device in said second circuit means for rendering the latter conductive substantially instantaneously upon the potential across said battery reaching a predetermined magnitude for energizing said other of said coils to trip said switch means into a position wherein said source is de-energized.

4. In a system for charging a battery, in combination, a source of pulsating direct current connectable across said battery; switch means in circuit with said source for selectively energizing and de-energizing same in respective positions of said switch means; electromagnetic means for operating said switch means, said electromagnetic means including a pair of oppositely poled coils acting upon said switch means; normally conductive first circuit means connecting one of said coils across said battery for energizing said one of said coils to maintain said switch means in a position wherein said source is energized, said first circuit means including a resistor in series with said one of said coils; normally nonconductive second circuit means connecting the other of said coils across said battery in series with a variable portion of said resistor; and a Zener-diode breakdown device in said second circuit means for rendering the latter conductive instantaneously upon the potential across said battery reaching a predetermined magnitude for energizing said other of said coils to trip said switch means into a position wherein said source is de-energized.

5. In a system for charging a battery, in combination, a source of pulsating direct current connectable across said battery; reed-switch means including first contact means in circuit with said source for selectively energizing and de-energizing same in respective positions of said first contact means; electromagnetic means for operating said switch means, said electromagnetic means including a pair of coaxial oppositely poled coils surrounding said switch means and acting thereupon; normally conductive first circuit means connecting one of said coils across said battery for energizing said one of said coils to maintain said switch means in a position wherein said source is energized, said first circuit means including a resistor in series with said one of said coils; normally nonconductive second circuit means connecting the other of said coils across said battery in series with a variable portion of said resistor, said switch means being provided with second contact means in series with both of said circuit means for de-energizing said coils simultaneously with the de-energization of said source by said first contact means; and a Zener-diode breakdown device in said second circuit means for rendering the latter conductive substantially instantaneously upon the potential across said battery reaching a predetermined magnitude for energizing said other of said coils to trip said switch means into a position wherein said source and said coils are de-energized.

References Cited by the Examiner

UNITED STATES PATENTS

| | | | |
|---|---|---|---|
| 2,209,051 | 7/1940 | Clayton | 320—39 |
| 2,556,371 | 6/1951 | Hussey | 323—66 X |
| 2,967,988 | 1/1961 | Seright | 320—40 X |
| 2,979,650 | 4/1961 | Godshalk et al. | 320—35 |

OTHER REFERENCES

"Silicon Zener Diode and Rectifier Handbook," Motorola, Incorporated, 2d ed., 1961, pp. 114, 115.

LLOYD McCOLLUM, *Primary Examiner.*